(12) United States Patent
Hida et al.

(10) Patent No.: US 8,035,732 B2
(45) Date of Patent: Oct. 11, 2011

(54) IMAGE PICKUP APPARATUS WITH ROTARY LENS BARREL

(75) Inventors: Hiroaki Hida, Kanagawa (JP);
Hirotsugu Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 11/900,563

(22) Filed: Sep. 12, 2007

(65) Prior Publication Data

US 2008/0068493 A1   Mar. 20, 2008

(30) Foreign Application Priority Data

Sep. 14, 2006  (JP) ................ P2006-249647

(51) Int. Cl.
*H04N 5/225* (2006.01)
(52) U.S. Cl. ..................................... 348/373
(58) Field of Classification Search .......... 348/373, 348/211.99
See application file for complete search history.

(56) References Cited

U.S. PATENT DOCUMENTS

| 6,628,338 B1* | 9/2003 | Elberbaum et al. ............ 348/373 |
| 2002/0176006 A1* | 11/2002 | Miura ....................... 348/211.99 |
| 2005/0140818 A1* | 6/2005 | Uemura et al. ............... 348/360 |
| 2006/0016280 A1* | 1/2006 | Hasegawa et al. ............ 74/89.23 |
| 2006/0238637 A1* | 10/2006 | Goto et al. ................ 348/333.06 |
| 2006/0268157 A1* | 11/2006 | Chang ........................... 348/373 |

FOREIGN PATENT DOCUMENTS

| JP | 2 4319 | 1/1990 |
| JP | 6 292045 | 10/1994 |
| JP | 8 186922 | 7/1996 |
| JP | 9 93471 | 4/1997 |
| JP | 2004 96518 | 3/2004 |

\* cited by examiner

*Primary Examiner* — Lin Ye
*Assistant Examiner* — Amy Hsu
(74) *Attorney, Agent, or Firm* — Frommer Lawrence & Haug LLP; William S. Frommer; Thomas F. Presson

(57) ABSTRACT

An image pickup apparatus including a lens barrel, a hollow shaft, a base, electric wiring, and a protection member. The lens barrel has a lens and an image pickup device embedded therein. The hollow shaft is rotatable about an axis intersecting with an optical axis of the lens. The axis serves as a central axis of the hollow shaft. The base supports the lens barrel in a rotatable manner by using the hollow shaft. The electric wiring extends through the inside of the hollow shaft to electrically transmit an image pickup signal of the image pickup device. The protection member is provided in the hollow shaft so as to prevent the electric wiring from coming into contact with the hollow shaft.

6 Claims, 8 Drawing Sheets

IMAGE PICKUP APPARATUS WITH ROTARY LENS BARREL

CROSS REFERENCES TO RELATED APPLICATIONS

The present invention contains subject matter related to Japanese Patent Application JP 2006-249647 filed in the Japanese Patent Office on Sep. 14, 2006, the entire contents of which are incorporated herein by reference.

BACKGROUND OF THE INVENTION

1. Field of the Invention

The present invention relates to an image pickup apparatus with a rotary lens barrel in which a lens barrel having a lens and an image pickup device embedded therein is rotatable. In particular, the present invention relates to a configuration capable of decreasing the length of electric wiring for electrically transmitting image pickup signals, reducing influence of noise applied to the image pickup signals, and markedly improving durability of the electric wiring.

2. Description of the Related Art

An example of an image pickup apparatus with a rotary lens barrel may be a video camera for video conferences and a video camera for surveillance. In such a video camera, a lens barrel may be rotated in a horizontal direction (hereinafter, referred to as "pan direction") and in a vertical direction (hereinafter, referred to as "tilt direction"). Image pickup signals from an image pickup device embedded in the lens barrel are electrically transmitted through electric wiring extending through a rotation portion. Thus, the important point is arrangement of the electric wiring at the rotation portion of the lens barrel.

For example, a configuration is known in which a rotation shaft of a lens barrel has a hollow portion, and electric wiring extends through the hollow portion of the rotation shaft. In particular, Japanese Unexamined Patent Application Publication No. 2004-96518 discloses a configuration in which a rotation shaft of a pan motor that rotates a lens barrel in the pan direction has a hollow portion, and electric wiring extends through the hollow portion of the rotation shaft. Accordingly, electric signals can be transmitted between the stationary side and the rotary side.

SUMMARY OF THE INVENTION

With the configuration disclosed in the publication, the electric wiring can be easily arranged at the rotation portion of the lens barrel, however, the electric wiring may be easily damaged, resulting in deterioration of the durability. That is, with the configuration disclosed in the publication, since the electric wiring extends through the hollow portion of the rotation shaft of the pan motor that rotates the lens barrel, the outer surface of the electric wiring may be often rubbed with the inner surface of the rotation shaft. If the coating of the electric wiring is damaged due to wear of the coating or the like, the electric wiring may suffer from short-circuit etc.

In addition, the image pickup apparatus tends to provide high image quality and high definition, and in recent years, even a video camera for video conferences is desired to provide a high-definition image. When image pickup signals with a high-definition (HD) image quality are electrically transmitted, an extremely large amount of image pickup signals are transmitted. Due to this, the electric wiring may use a harness (a bundle of electric wiring) which is expensive, and hence, the expensive harness may not be frequently replaced with new one even if the harness comes into contact with the rotation shaft and gets damaged.

In addition, when the image pickup signals with the HD image quality are electrically transmitted, the influence of noise may be applied to the image pickup signals more frequently as compared with a case of image pickup signals with a standard-definition (SD) image quality. Therefore, the length of harness is desired to be minimized in view of the cost and the influence of noise applied to the image pickup signals. In the image pickup apparatus with the rotary lens barrel, since the length of the path of the harness extending through the rotation portion of the lens barrel is minimized, the durability of the harness in the hollow portion of the rotation shaft is desired to be improved. A slip ring may be provided at the rotation portion, however, the slip ring may cause a serious problem related to the noise when the image pickup signals with the HD image quality are electrically transmitted.

Accordingly, it is desirable to provide an image pickup apparatus with a rotary lens barrel in which a rotation shaft has a hollow portion and a harness or the like extends through the hollow portion of the rotation shaft, so as to minimize a wiring length, prevent the electric wiring from being damaged because the outer surface of the electric wiring comes into contact with the inner surface of the rotation shaft, and markedly improve durability of the electric wiring.

The present invention provides the following configurations.

An image pickup apparatus with a rotary lens barrel according to an embodiment of the present invention includes a lens barrel, a hollow shaft, a base, electric wiring, and a protection member. The lens barrel has a lens and an image pickup device embedded therein. The hollow shaft is rotatable about an axis intersecting with an optical axis of the lens. The axis serves as a central axis of the hollow shaft. The base supports the lens barrel in a rotatable manner by using the hollow shaft. The electric wiring extends through the inside of the hollow shaft to electrically transmit an image pickup signal of the image pickup device. The protection member is provided in the hollow shaft so as to prevent the electric wiring from coming into contact with the hollow shaft.

With this configuration, the lens barrel having the lens and the image pickup device embedded therein is rotated by way of the hollow shaft about the central axis, or the axis intersecting with the optical axis of the lens. The electric wiring for electrically transmitting the image pickup signals of the image pickup device extends through the inside of the hollow shaft. Therefore, since the electric wiring extends through the rotation center of the lens barrel even while the lens barrel is rotated, the electric wiring can be easily arranged at the rotation portion. Also, since the electric wiring extends through the shortest path, the length of the electric wiring in the imaging apparatus with the rotary lens barrel may be minimized.

In addition, the protection member is provided in the rotational hollow shaft, to prevent the electric wiring from coming into contact with the hollow shaft. Accordingly, even while the hollow shaft is rotated for the rotation of the lens barrel, since the protection member is interposed between the electric wiring and the hollow shaft, the outer surface of the electric wiring may be prevented from being rubbed with the inner surface of the hollow shaft. Thus, the electric wiring can be prevented from being damaged and the short-circuit or the like can be prevented even though the electric wiring extends through the inside of the hollow shaft.

With the configuration, since the electric wiring that transmits the image pickup signals of the image pickup device extends through the inside of the rotational hollow shaft, the electric wiring can be easily arranged at the rotation portion of the lens barrel, and consequently, the wiring length of the electric wiring may become short. As a result, not only the cost of the electric wiring may be reduced, but also the influence of the noise applied to the image pickup signals can be reduced. In addition, since the protection member prevents the electric wiring from being damaged even though the electric wiring extends through the inside of the rotational hollow shaft, the durability of the electric wiring may be markedly improved.

DESCRIPTION OF THE PREFERRED EMBODIMENTS

An embodiment of the present invention is described below with reference to the drawings.

Though described in detail below, in this embodiment, a video camera 10 for video conferences is used as an example of an image pickup apparatus with a rotary lens barrel. The video camera 10 in this embodiment can electrically transmit image pickup signals with a high-definition (HD) image quality, by using an image pickup device 32 such as a charge coupled device (CCD) image sensor or a complementary metal oxide semiconductor (CMOS) image sensor.

Figure 1:
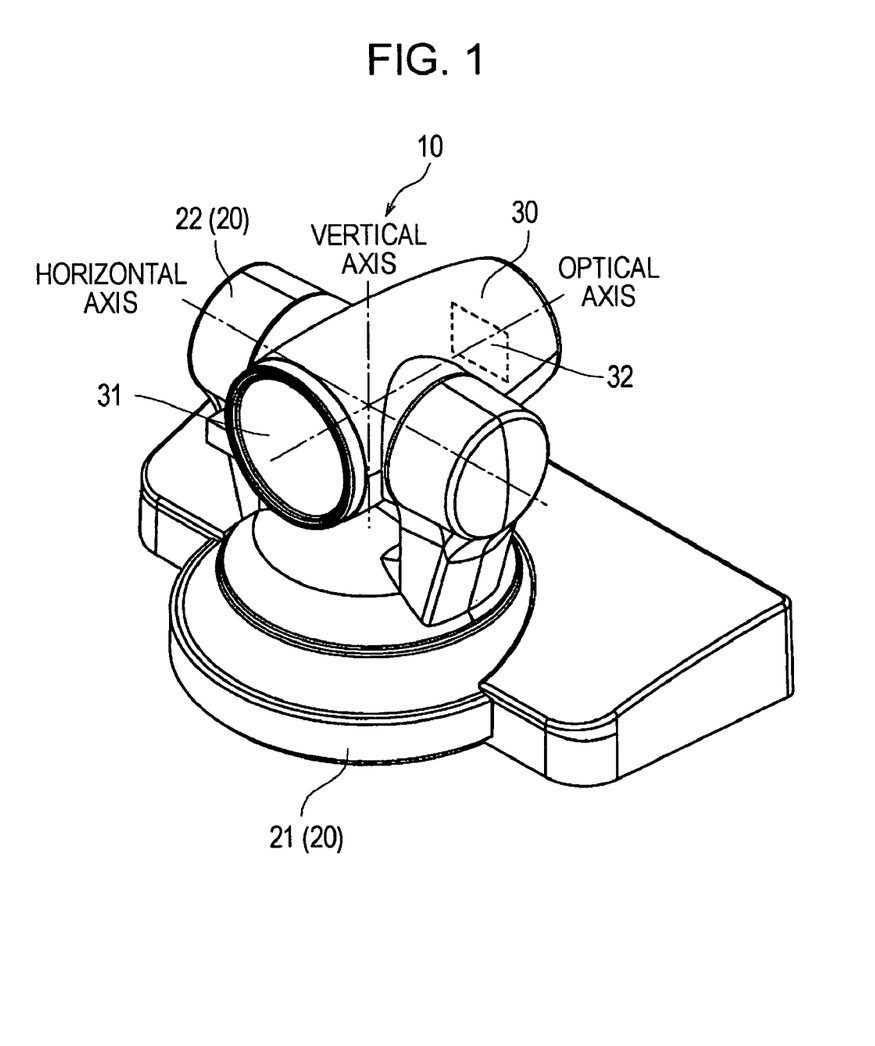
FIG. 1 is a perspective view showing a video camera according to an embodiment.

FIG. 1 is a perspective view showing the video camera 10 in this embodiment.

As shown in FIG. 1, the video camera 10 in this embodiment is installed in a conference room or the like by using a base 20, so that the video camera 10 may be used for video conferences etc. The base 20 includes a stationary sub-base 21 for installing the video camera 10 in the conference room or the like, and a rotary sub-base 22 that is rotatable with respect to the stationary sub-base 21 and supports a lens barrel 30. The lens barrel 30 has a lens 31 and the image pickup device 32 embedded therein. A video conference etc. may be performed by rotating the rotary sub-base 22 so that an optical axis of the lens 31 is pointed at the members of the conference, and electrically transmitting the image pickup signals from the image pickup device 32.

As long as the stationary sub-base 21 is horizontally installed, the rotary sub-base 22 is rotated in a pan direction about a vertical axis shown in FIG. 1 as the central axis thereof. Thus, the lens 31 can be pointed at every individual member seated in front of a conference table. In this case, since the vertical axis as the rotation center of the rotary sub-base 22 intersects with the optical axis of the lens 31, the optical axis of the lens 31 constantly passes through the vertical axis even when the lens barrel 30 (the lens 31 and the image pickup device 32) is rotated with the rotation of the rotary sub-base 22.

The lens barrel 30 is also rotated with respect to the rotary sub-base 22 in a tilt direction about a horizontal axis shown in FIG. 1 as the central axis thereof. Thus, the lens 31 can be tilted up and down in accordance with, for example, the height of the members of the conference, or the height of a screen for presentation. Since the horizontal axis as the rotation center of the lens barrel 30 intersects with the optical axis of the lens 31 and is orthogonal to the vertical axis as the rotation center of the rotary sub-base 22, by properly rotating the rotary sub-base 22 and the lens barrel 30, the direction of the lens 31 can be three-dimensionally controlled while the intersection point of the optical axis, vertical axis and horizontal axis is held in a predetermined position. Accordingly, the lens 31 can be pointed at a desired direction of left, right, up, and down directions.

Figure 2:
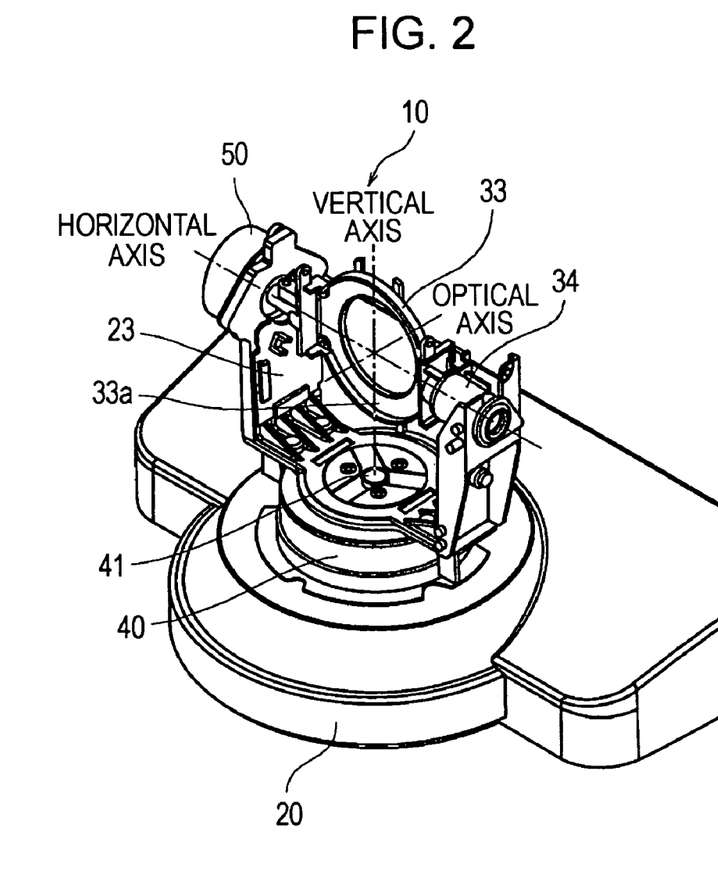
FIG. 2 is a partially exploded perspective view showing the video camera according to the embodiment.

FIG. 2 is a partially exploded perspective view showing the video camera 10 in this embodiment.

As shown in FIG. 2, a pan motor 40 (corresponding to a rotation driving section) is accommodated in the base 20. The pan motor 40 has a hollow shaft 41 as a rotation shaft. The hollow shaft 41 is rotated about the axis (vertical axis) intersecting with the optical axis of the lens 31 (see FIG. 1). A substantially angular C-shaped chassis 23 is fixed at the hollow shaft 41. The chassis 23 is rotated by rotating the hollow shaft 41 using the pan motor 40.

Also, a tilt motor 50 and a sleeve 34 are mounted to the chassis 23, for rotatably supporting left and right sides of a lens mount 33 disposed in the lens barrel 30 (see FIG. 1). The axis (horizontal axis) orthogonal to the optical axis of the lens 31 (see FIG. 1) serves as the central axis of the lens mount 33. Accordingly, the lens mount 33 is rotated about the horizontal axis as the central axis thereof by rotating the tilt motor 50. The supporting position of the base 20 for the lens barrel 30 is adjustable. A positioning hole 33a (described below) is formed at a lower end portion of the lens mount 33.

Since the video camera 10 in this embodiment has the pan motor 40, the lens barrel 30 (see FIG. 1) may be rotated in the pan direction by rotating the pan motor 40. In particular, the lens barrel 30 is supported by the hollow shaft 41 with the chassis 23 interposed therebetween so as to be rotatable with respect to the base 20. The hollow shaft 41 is a portion (rotation shaft) of the pan motor 40. By rotating the pan motor 40, the hollow shaft 41 is rotated about the vertical axis as the central axis thereof, and accordingly, the chassis 23 is rotated in the pan direction. Thus, the lens barrel 30 is rotated in the pan direction.

In addition, since the video camera 10 in this embodiment has the tilt motor 50, the lens barrel 30 (see FIG. 1) may be rotated in a tilt direction by rotating the tilt motor 50. In particular, the lens barrel 30 is supported by the tilt motor 50 and the sleeve 34 with the lens mount 33 interposed between the lens barrel 30, and the tilt motor 50 and sleeve 34, so as to be rotatable with respect to the chassis 23. Accordingly, the lens mount 33 is rotated about the horizontal axis as the central axis thereof by rotating the tilt motor 50. Thus, the lens barrel 30 may be rotated in the tilt direction in addition to the pan direction.

Meanwhile, in the case where the lens barrel 30 shown in FIG. 1 is rotated in the pan or tilt direction, it is important how the image pickup signals of the image pickup device 32 embedded in the lens barrel 30 are electrically transmitted at the rotation portion. In particular, the image pickup signals of the image pickup device 32 are desired to be transmitted to the base 20 via a tilt-direction rotation portion provided by the lens mount 33 shown in FIG. 2 and the chassis 23, and via a pan-direction rotation portion provided by the chassis 23 and the base 20 (pan motor 40). Thus, in the video camera 10 of this embodiment, the image pickup signals are transmitted through the inside of the sleeve 34 at the tilt-direction rotation portion, and through the inside of the hollow shaft 41 at the pan-direction rotation portion.

Figure 3:
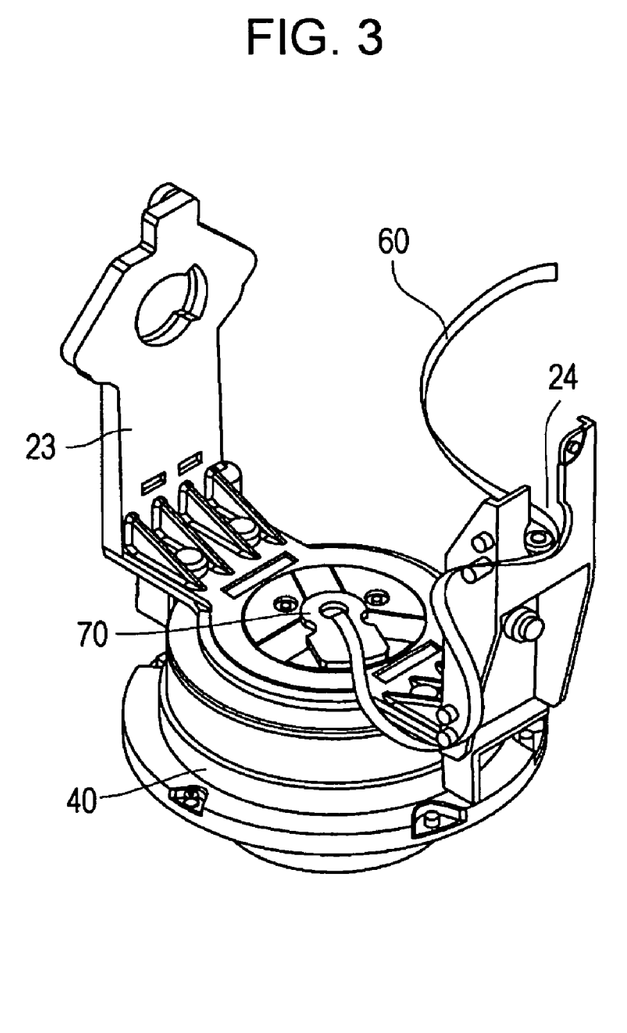
FIG. 3 is a perspective view showing a chassis and a pan motor of the video camera according to the embodiment.

FIG. 3 is a perspective view showing the chassis 23 and the pan motor 40 of the video camera 10 according to the embodiment.

The chassis 23 shown in FIG. 3 is fixed to the hollow shaft 41 (see FIG. 2) of the pan motor 40 as described above. As shown in FIG. 3, a harness holder 70 (corresponding to a protection member) made of a hollow pipe is inserted to the hollow shaft 41.

A harness 60 (corresponding to electric wiring) that electrically transmits the image pickup signals of the image pickup device 32 (see FIG. 1) extends through a sleeve mounting groove 24 to which the sleeve 34 (see FIG. 2) is mounted, and enters the inside of a hollow portion of the harness holder 70. In particular, in the video camera 10 of this embodiment, the harness 60 extends through the inside of the sleeve 34 (tilt-direction rotation center) and the inside of the sleeve mounting groove 24 at the tilt-direction rotation portion, extends through the inside of the hollow shaft 41 (see FIG. 2, pan-direction rotation center) and the inside of the harness holder 70 at the pan-direction rotation portion, and then reaches the base 20 (see FIG. 2). The harness 60 may electrically transmit a control signal and the like concurrently with the transmission of the image pickup signals, or may distribute power.

The rotation angle in the pan direction (rotation direction of the chassis 23) is larger than that in the tilt direction, and the frequency of rotations in the pan direction is higher than that in the tilt direction. If the harness 60 does not extend through the inside of the hollow shaft 41 (see FIG. 2), for example, the harness 60 may be loosely wounded around the hollow shaft 41 over and over so as to allow the chassis 23 to be rotated. This may increase the length of the harness 60 by a length wounded around the hollow shaft 41, resulting in noticeable increase in a wiring length of the harness 60.

However, in the video camera 10 of this embodiment, the harness 60 extends through the inside of the hollow shaft 41 (see FIG. 2) and the inside of the harness holder 70 as mentioned above. That is, the harness 60 extends from the image pickup device 32 (see FIG. 1) to the stationary sub-base 21 (see FIG. 1) through the shortest path. Accordingly, the length of the harness 60 wounded around the hollow shaft 41 may be omitted, and the wiring length of the harness 60 becomes short. This may reduce the cost of the harness 60, and also reduce influence of noise applied to the image pickup signals.

In addition, as the case of the rotation in the pan direction (rotation direction of the chassis 23) having the large angle of rotation and the high frequency of rotations, if the harness 60 directly extends through the inside of the hollow shaft 41 (see FIG. 2) which is rotated by the pan motor 40, the coating of the harness 60 may be damaged due to wear caused by the hollow shaft 41. This is because the hollow shaft 41 made of metal is often rubbed with the harness 60 which is a bundle of electric wiring having copper wires with the periphery thereof coated with soft resin.

However, in the video camera 10 of this embodiment, the harness holder 70 is inserted to the hollow shaft 41 (see FIG. 2) as mentioned above. The harness 60 extends through the inside of the harness holder 70. Since the harness holder 70 is interposed between the harness 60 and the hollow shaft 41, the coating resin of the harness 60 does not directly come into contact with the metal hollow shaft 41 rotated by the pan motor 40. Accordingly, the harness 60 may be prevented from being damaged.

Next, the relationship among the pan motor 40, the hollow shaft 41 of the pan motor 40, and the harness 60; and the harness holder 70 are described in detail.

Figure 4:
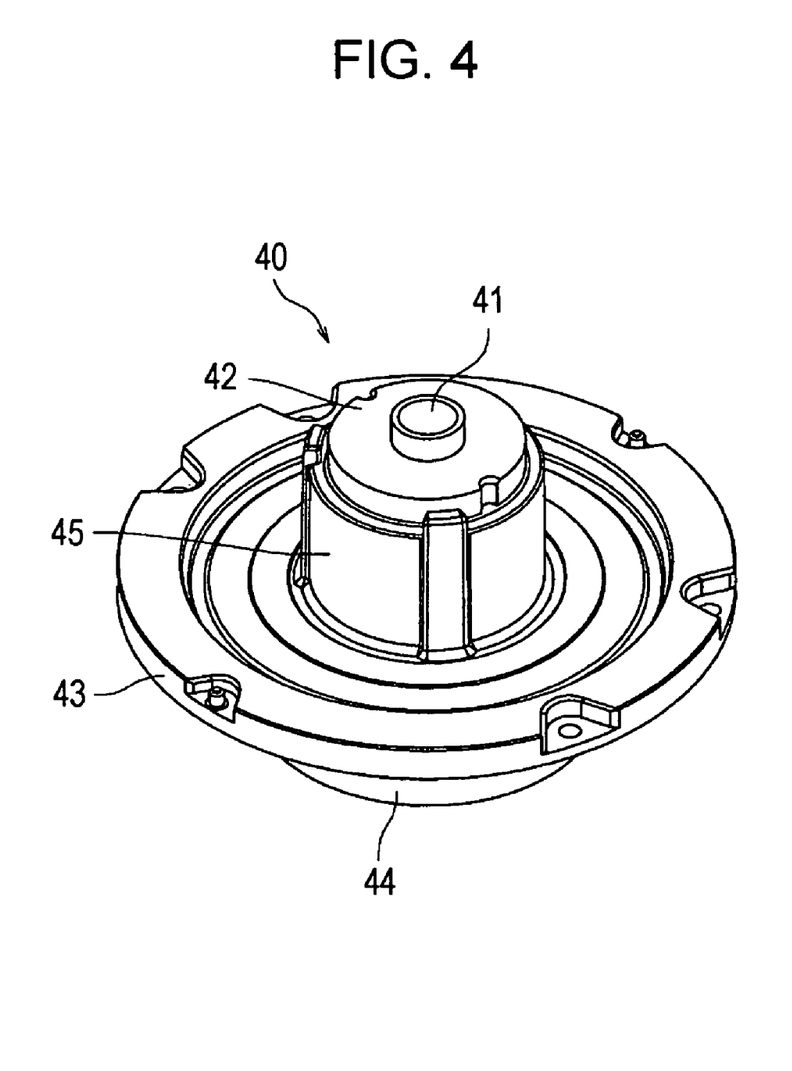
FIG. 4 is a perspective view showing the pan motor used for the video camera according to the embodiment.

FIG. 4 is a perspective view showing the pan motor 40 used for the video camera 10 according to the embodiment.

Figure 5:
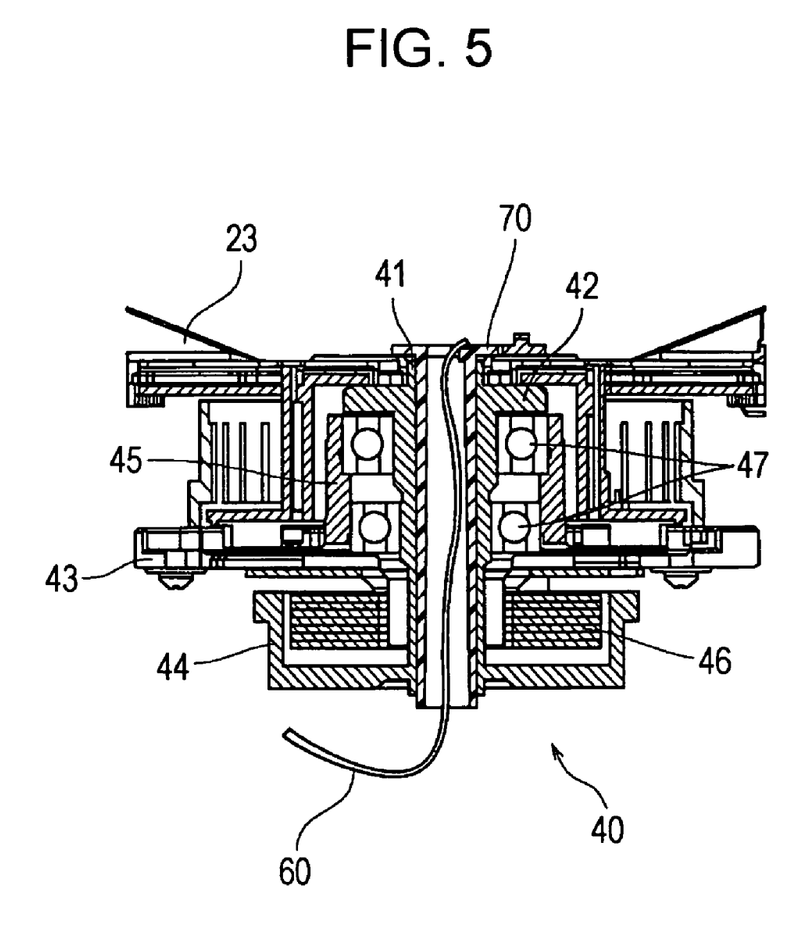
FIG. 5 is a cross-sectional view showing a relationship between the pan motor shown in FIG. 4 and a harness.

FIG. 5 is a cross-sectional view showing the relationship between the pan motor 40 shown in FIG. 4 and the harness 60.

As shown in FIGS. 4 and 5, the pan motor 40 includes the rotational hollow shaft 41, a ring 42 surrounding the hollow shaft 41, a board 43 for fixing the pan motor 40 to the base 20 (see FIG. 2), a rotor case 44 located below the board 43, and a housing 45 located above the board 43.

As shown in FIG. 5, a laminated iron core 46 is disposed in the rotor case 44, and bearings 47 are disposed in the housing 45. As a rotational drive force is generated between the rotor case 44 and the iron core 46, the rotational force of the rotor case 44 is transmitted to the hollow shaft 41 supported by the bearings 47, and the hollow shaft 41 is rotated. With the rotation of the hollow shaft 41, the ring 42 is rotated. Since the chassis 23 is mounted to the ring 42, as the hollow shaft 41 is rotated, the chassis 23 is rotated.

As described above, the hollow shaft 41 is a portion (rotation shaft) of the pan motor 40. The pan motor 40 can directly drive the chassis 23 without a gear, i.e., the pan motor 40 is a direct-drive motor. The harness holder 70 made of resin is inserted to the hollow shaft 41 made of metal, and the harness 60 extends through the hollow portion of the harness holder 70.

Figure 6A:
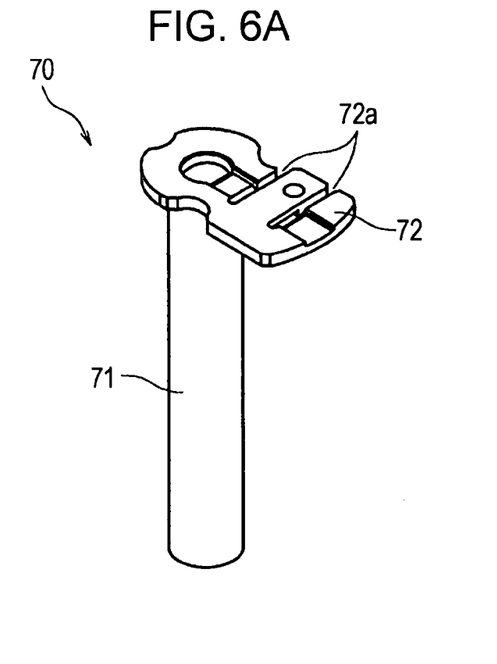
FIGS. 6A and 6B are a perspective view and a cross-sectional view each showing a harness holder of the video camera according to the embodiment.
Figure 6B:
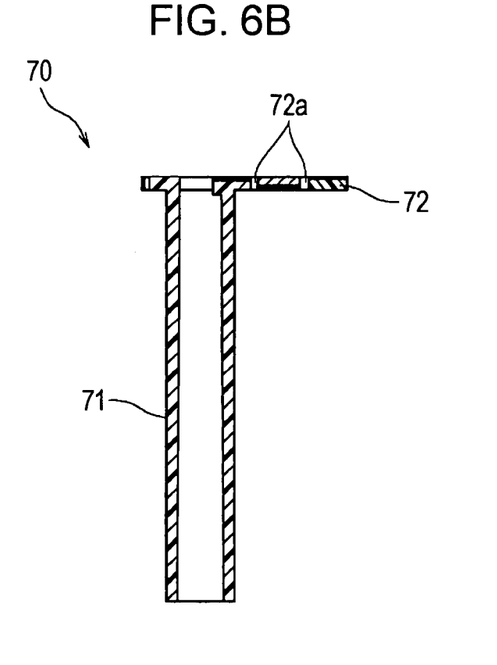

FIGS. 6A and 6B are a perspective view and a cross-sectional view each showing the harness holder 70 of the video camera 10 according to the embodiment.

As shown in FIGS. 6A and 6B, the harness holder 70 is a hollow pipe having a hollow harness protection portion 71 (corresponding to a wiring protection portion) and a flange-like harness fixing portion 72 (corresponding to a wiring fixing portion) formed at the upper end of the harness protection portion 71. The harness fixing portion 72 has a harness fixing groove 72a so that the harness 60 (see FIG. 5) is hooked and fixed thereto.

As shown in FIG. 5, the length of the harness holder 70 corresponds to the length of the hollow shaft 41. When the harness holder 70 (harness protection portion 71) shown in FIGS. 6A and 6B is inserted from the upper side to the lower side of the hollow shaft 41, the harness fixing portion 72 is mounted on the upper surface of the hollow shaft 41. The harness protection portion 71 penetrates through the inside of the hollow shaft 41, and the lower end of the harness protection portion 71 slightly protrudes from the lower surface of the hollow shaft 41. Accordingly, the harness holder 70 (harness protection portion 71) is provided over the entire length of the inner surface of the hollow shaft 41.

The harness holder 70 is made of resin (for example, polyacetal resin or fluorocarbon resin) having a sliding property and formed such that the harness protection portion 71 and the harness fixing portion 72 are integrally molded. Accordingly, even when the harness holder 70 (harness protection portion 71) is inserted to the hollow shaft 41, the harness holder 70 does not obstruct the rotation of the hollow shaft 41. Since the harness 60 extends through the hollow portion of the harness protection portion 71, the harness 60 can be prevented from being damaged.

To be more specific, as shown in FIG. 5, the harness holder 70 (harness protection portion 71 shown in FIGS. 6A and 6B) is provided over the entire length of the inner surface of the hollow shaft 41. When the harness 60 extends through the hollow portion of the harness protection portion 71, the harness protection portion 71 made of resin having the sliding property is interposed between the coating resin of the harness 60 and the rotational hollow shaft 41 made of metal. Accordingly, the coating resin of the harness 60 may not be rubbed with the hollow shaft 41 made of metal. The coating resin of the harness 60 comes into contact with the resin having the sliding property (harness protection portion 71). Thus, wear or the like of the coating resin of the harness 60 may be suppressed, and hence, the harness 60 is prevented from being damaged. This may markedly improve durability of the harness 60.

In addition, the harness 60 can be fixed at the harness fixing portion 72 shown in FIGS. 6A and 6B. Accordingly, not only the harness 60 can be easily arranged, but also the harness 60 would not obstruct the rotation of the chassis 23. In particular, the harness 60 is hooked and fixed to the harness fixing groove 72a of the harness fixing portion 72 formed at the upper end of the harness protection portion 71, and then extends through the hollow portion of the harness protection portion 71. Accordingly, the harness 60 extending from the sleeve mounting groove 24 (see FIG. 3) along the substantially angular C-shaped chassis 23 is fixed by the harness fixing portion 72 in the horizontal direction. Thus, the harness 60 is not lifted up at the upper end portion of the harness holder 70, and the harness 60 does not become obstructive.

As described above, in the video camera 10 of this embodiment, the harness holder 70 is inserted to the hollow shaft 41, and the harness 60 extends through the hollow portion of the harness holder 70. Accordingly, the harness 60 can be easily arranged at the rotation portion of the chassis 23. In addition, since the wiring length of the harness 60 becomes short, not only the cost of the harness 60 can be reduced, but also the influence of the noise applied to the image pickup signals can be reduced. Further, in the video conference etc., the wear of the harness 60 may be suppressed even if the video camera 10 is rotated many times in the pan and tilt directions. Accordingly, a failure of the video camera 10 caused by the damage of the harness 60 can be reduced.

In a case where the video camera 10 is rotated in the pan and tilt directions, the pan-direction rotation shaft (vertical axis) of the lens barrel 30 (lens 31) shown in FIG. 1 may be aligned with the optical axis of the lens 31. Also, the tilt-direction rotation shaft (horizontal axis) of the lens barrel 30 (lens 31) may be aligned with the optical axis of the lens 31. In this case, the horizontal axis and the optical axis can be easily positioned such that the horizontal axis intersects with the optical axis if the assembly accuracy of the lens barrel 30 is secured.

However, the intersection of the vertical axis and the optical axis relies upon the dimensional accuracy of the substantially angular C-shaped chassis 23 shown in FIG. 2, the attachment accuracy of the lens mount 33, and the like, and consequently, the optical axis may be deviated from the vertical axis. That is, the dimensional error of the chassis 23, the attachment error of the lens mount 33, and the like. may cause the lens mount 33 to be deviated along the horizontal axis. In such a case, the deviation is desired to be corrected so that the optical axis intersects with the vertical axis, however, this positional adjustment of the lens mount 33 (lens barrel 30) is extremely troublesome work.

Therefore, in the video camera 10 of this embodiment, the hollow shaft 41 is used. Even when a relatively large error is found in the dimension of the chassis 23, the position of the lens mount 33 can be easily adjusted, and the attachment accuracy desired for the lens barrel 30 can be easily secured. In other words, the lens mount 33 can be easily positioned by utilizing the positioning hole 33a of the lens mount 33 and a positioning jig 80 (described below).

Figure 7A:
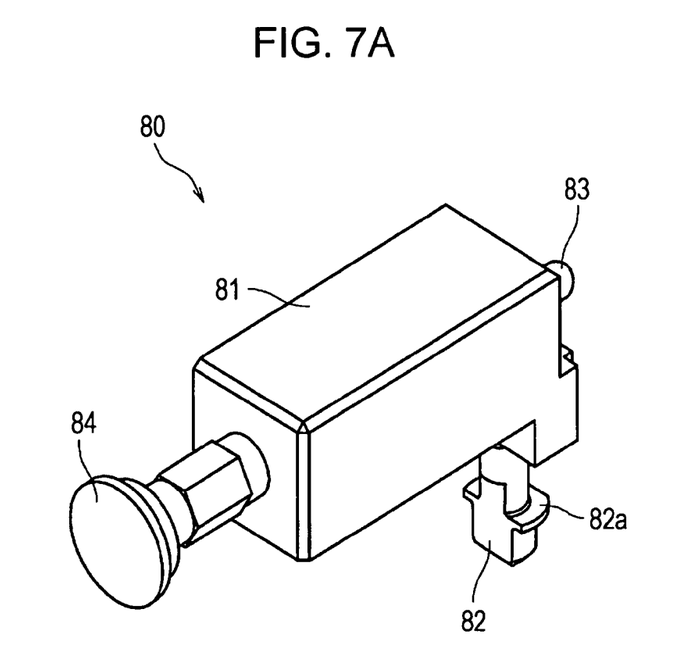
FIGS. 7A and 7B are a perspective view and a cross-sectional view each showing a positioning jig used for the video camera according to the embodiment.
Figure 7B:
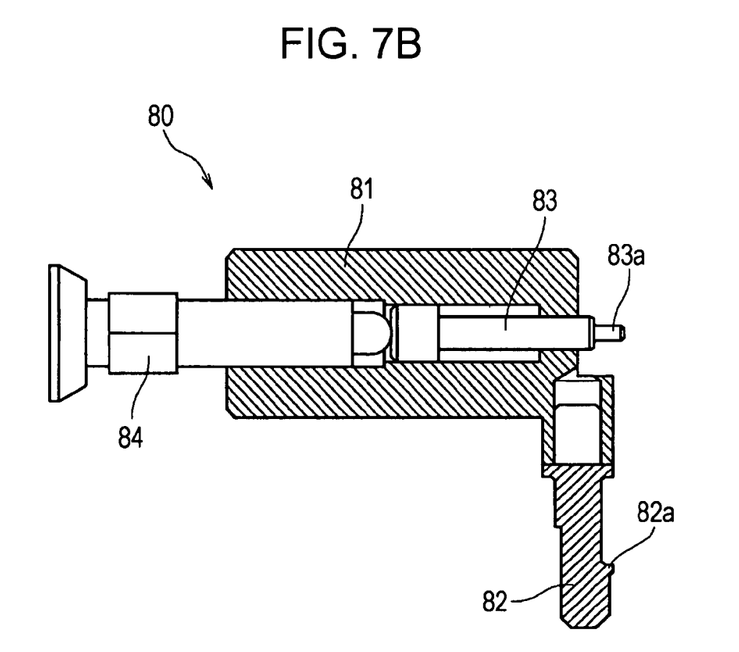

FIGS. 7A and 7B are a perspective view and a cross-sectional view each showing the positioning jig 80 used for the video camera 10 according to the embodiment.

As shown in FIGS. 7A and 7B, the positioning jig 80 includes a positioning pin 83 for adjusting the position of the lens mount 33 (see FIG. 2), a pusher 84 for moving the positioning pin 83 along the axis thereof, a pin holder 81 for holding the positioning pin 83 and the pusher 84 therein, and a reference pin 82 integrally formed with the pin holder 81 and being able to be inserted to the hollow shaft 41 (see FIG. 2).

The reference pin 82 extends perpendicularly to the pin holder 81, and has a pin flange 82a in a position at a predetermined distance from the tip end of the reference pin 82. The central axis of the reference pin 82 is orthogonal to the central axis of the positioning pin 83. Therefore, by inserting the reference pin 82 from the upper side to the lower side of the hollow shaft 41 (see FIG. 2), the pin flange 82a is mounted on the upper surface of the hollow shaft 41. Since the central axis of the reference pin 82 is aligned with the vertical axis shown in FIG. 2, the central axis of the positioning pin 83 inhibits the lens barrel 30 (see FIG. 1) from being rotated in the tilt direction (rotation angle=0°), and becomes parallel to the optical axis with the optical axis pointed at the front side.

The positioning pin 83 is held in the pin holder 81 while the positioning jig 80 is not used. A fitting portion 83a is provided at the tip end of the positioning pin 83, and by pushing the pusher 84, the positioning pin 83 protrudes from the pin holder 81. The fitting portion 83a may be fitted into the positioning hole 33a of the lens mount 33 shown in FIG. 2. Accordingly, the lens mount 33 can be positioned by inserting the reference pin 82 into the hollow shaft 41 (see FIG. 2), then pushing the pusher 84, and adjusting the position of the lens mount 33 such that the fitting portion 83a of the positioning pin 83 is fitted into the positioning hole 33a of the lens mount 33.

Figure 8:
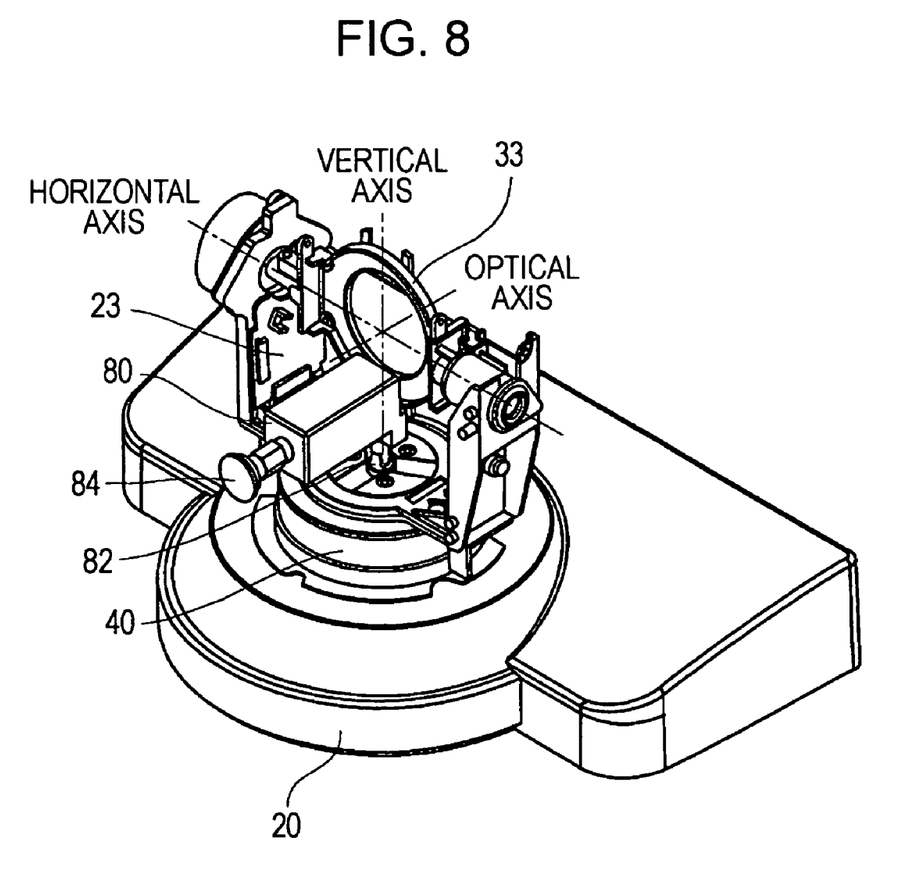
FIG. 8 is a perspective view showing the positioning jig shown in FIGS. 7A and 7B during use.

FIG. 8 is a perspective view showing the positioning jig 80 shown in FIGS. 7A and 7B during use.

As shown in FIG. 8, when the reference pin 82 of the positioning jig 80 is inserted to the hollow shaft 41 (see FIG. 2), the central axis of the reference pin 82 is aligned with the vertical axis. Also, the central axis of the positioning pin 83 (see FIGS. 7A and 7B) becomes orthogonal to the vertical axis, and becomes parallel to the optical axis with the lens mount 33 facing the front side.

However, the lens mount 33 may be attached in a manner deviated along the horizontal axis depending on the dimensional accuracy of the substantially angular C-shaped chassis 23, the attachment accuracy when the lens mount 33 is attached to the chassis 23, and the like. Due to this, the optical axis may not intersect with the vertical axis. Thus, the position of the lens mount 33 in the horizontal direction is desired to be adjusted such that the optical axis intersects with the vertical axis.

To position the lens mount 33 by way of the positioning pin 83 (see FIGS. 7A and 7B), the reference pin 82 of the positioning jig 80 is inserted to the hollow shaft 41 (see FIG. 2), and then the pusher 84 is pushed. In particular, since the position of the lens mount 33 in the horizontal direction is adjusted such that the fitting portion 83a of the positioning pin 83 shown in FIGS. 7A and 7B is fitted into the positioning hole 33a (see FIG. 2) of the lens mount 33, the central axis of the positioning pin 83 becomes orthogonal to the vertical axis. Accordingly, the optical axis is positioned so as to be orthogonal to the vertical axis. Thus, the optical axis of the lens barrel 30 (see FIG. 1) becomes orthogonal to the vertical axis by way of the lens mount 33 positioned by the positioning jig 80.

As described above, in the video camera 10 of this embodiment, since the harness 60 that electrically transmits the image pickup signals of the image pickup device 32 extends through the inside of the hollow shaft 41, the harness 60 may be easily arranged at the rotation portion of the chassis 23, and the wiring length of the harness 60 may become short. As a result, not only the cost of the harness 60 can be reduced, but also the influence of the noise applied to the image pickup signals can be reduced. Accordingly, this configuration may be markedly effective particularly for electrically transmitting the image pickup signals with the HD image quality.

In addition, the harness 60 may be prevented from being damaged by the harness holder 70 even when the harness 60 extends through the inside of the rotational hollow shaft 41, thereby markedly increasing the durability of the harness 60. Accordingly, this configuration may be markedly effective particularly for the video camera 10 for video conferences when the lens barrel 30 (lens 31) is often rotated in the pan direction.

Further, when the pan-direction rotation shaft (vertical axis) of the lens barrel 30 (lens 31) is aligned with the optical axis of the lens 31, the supporting position of the base 20 for the lens barrel 30 can be easily adjusted by way of the positioning jig 80 using the hollow shaft 41. Accordingly, the adjustment can easily overcome the problems related to the dimensional accuracy of the substantially angular C-shaped chassis 23 and the attachment accuracy of the lens mount 33 etc., thereby improving productivity of the video camera 10.

While the exemplary embodiment of the present invention is described above, the present invention is not limited to the embodiment, and for example, the following various modifications may be made.

(1) While the video camera 10 for video conferences is used as an example of the image pickup apparatus with the rotary lens barrel in this embodiment, the image pickup apparatus with the rotary lens barrel may be any without limiting to the video camera 10 as long as an image pickup apparatus has a lens barrel 30 which is rotatable. While the video camera 10 can be rotated in both the pan and tilt directions in the embodiment, the video camera 10 may be rotated at least in one of the pan and tilt directions. The harness holder 70 may be applied to this rotation portion.

(2) While the harness holder 70 is inserted to the hollow shaft 41 which is rotated in the pan direction to protect the harness 60 in the embodiment, the harness holder 70 may be used for the tilt-direction rotation portion without limiting to the pan-direction rotation portion. Alternatively, harness holders 70 may be used to both the tilt- and pan-direction rotation portions. Further, while the harness holder 70 is a hollow pipe and the outer diameter of the harness protection portion 71 corresponds to the inner diameter of the hollow shaft 41 in this embodiment, the configuration is not limited thereto as long as the harness 60 may be prevented from coming into contact with the hollow shaft 41, at the inside of the hollow shaft 41.

(3) While the pan motor 40 is provided for rotating the lens barrel 30 and the hollow shaft 41 to which the harness holder 70 is inserted is a portion of the pan motor 40 in the embodiment, the pan motor 40 may not be the direct-drive motor. The pan motor 40 may rotate the lens barrel 30 via a gear or the like. Alternatively, the rotation shaft of the tilt motor 50 may be hollow, and the harness holder 70 may be inserted to the hollow portion. Still alternatively, the lens barrel 30 may be rotated manually without using the pan motor 40 or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus with a rotary lens barrel, comprising:
    a lens barrel having a lens and an image pickup device embedded therein;
    a hollow shaft rotatable about an axis intersecting with an optical axis of the lens, the axis serving as a central axis of the hollow shaft;
    a base that supports the lens barrel in a rotatable manner by using the hollow shaft;
    electric wiring extending through the inside of the hollow shaft to electrically transmit an image pickup signal of the image pickup device; and
    a protection member provided in the hollow shaft so as to prevent the electric wiring from coming into contact with the hollow shaft,
    wherein the protection member, being a hollow pipe inserted in the hollow shaft and interposed between coating resin, of the electric wiring and the hollow shaft, is made of resin and is provided over the entire length of the inner surface of the hollow shaft.

2. The image pickup apparatus with the rotary lens barrel according to claim 1,
    wherein the base includes a stationary sub-base and a rotary sub-base that supports the lens barrel,
    wherein the rotary sub-base is rotated with respect to the stationary sub-base about the central axis of the hollow shaft, and
    wherein the lens barrel is rotated with respect to the rotary sub-base about an axis orthogonal to the central axis of the hollow shaft.

3. The image pickup apparatus with the rotary lens barrel according to claim 1,
    wherein the base includes a rotation driving section for rotating the lens barrel, and
    wherein the hollow shaft is a portion of the rotation driving section.

4. The image pickup apparatus with the rotary lens barrel according to claim 1, wherein a supporting position of the base for the lens barrel is adjustable.

5. The image pickup apparatus with the rotary lens barrel according to claim 1, wherein the protection member is made of a resin hollow pipe having a sliding property.

6. The image pickup apparatus with the rotary lens barrel according to claim 1, wherein the protection member includes a wiring protection portion that protects the electric wiring, and a wiring fixing portion that fixes the electric wiring.

* * * * *